Sept. 25, 1962    W. G. TUNNESSEN    3,055,398
SPACER
Filed May 12, 1960
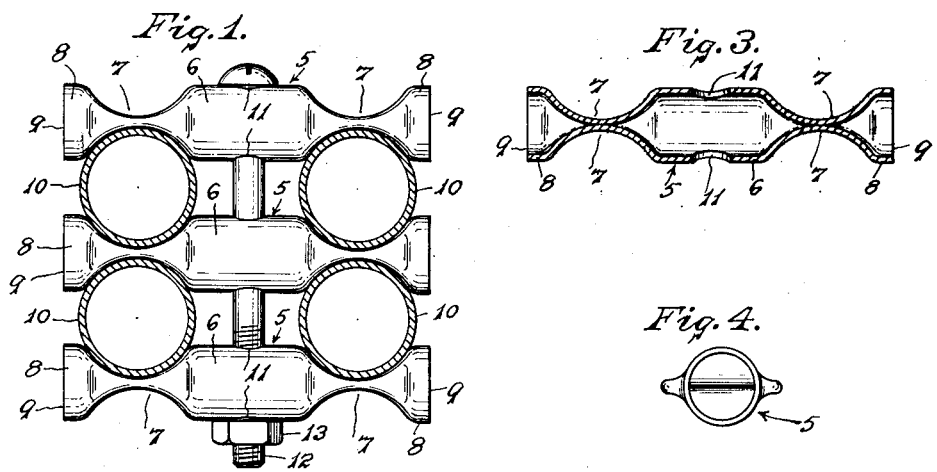
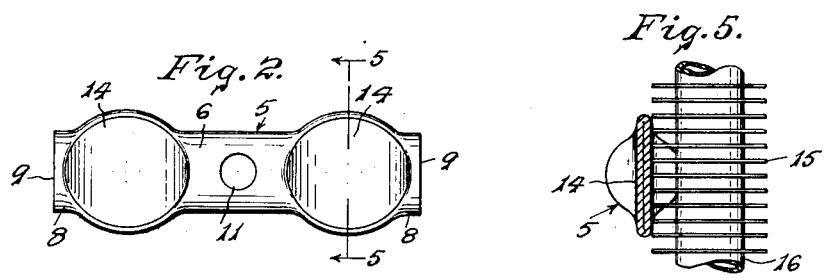
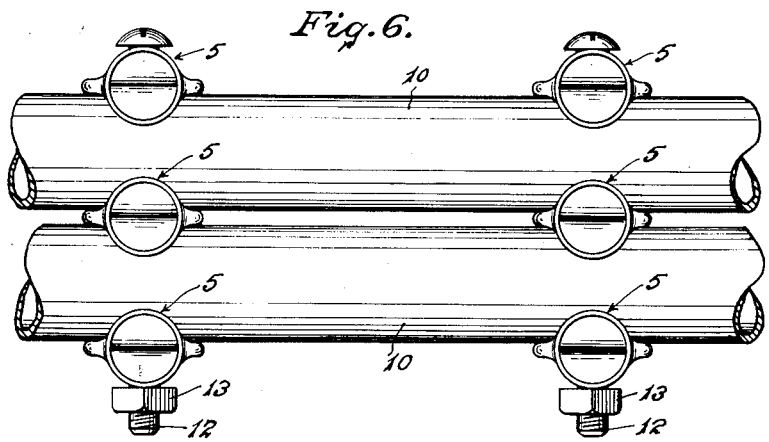
INVENTOR.
WILLIAM G. TUNNESSEN
BY Louis V. Lucia
ATTORNEY.

3,055,398
SPACER

William G. Tunnessen, Hazleton, Pa., assignor to Tunnessen's Radiator Shop, Hazleton, Pa., a partnership
Filed May 12, 1960, Ser. No. 28,762
2 Claims. (Cl. 138—111)

This invention relates to a spacer and more particularly to a tubing spacer and clamp which is especially adapted for spacing and supporting the tubular coils of heat exchanger elements and the like, but may also be used for holding tubes, cables, conduits or the like in fixed, spaced relationship conveniently, inexpensively and efficiently, either temporarily or permanently.

In manufacturing tubular heat exchanger elements, tubing is usually formed into multiple coils or convolutions which are maintained in a predetermined, fixed, spaced relationship to each other in order to maximize the efficiency of said elements and to reduce the number of coils or convolutions required therefor. It has been the custom to use various and sundry clamping and spacing means to accomplish the aforesaid. Frequently, flat metal strips or stays have even been welded to the walls of the tubing to secure it in such fixed, spaced relationship. Often, arcuate pieces of metal have been welded together as described in Patent No. 2,236,882, so as to embrace the individual tubes of an element in order to form a spacer and clamp therefor. Occasionally, collars are placed around the tubing and stays welded thereto in order to interconnect and space said tubing—a time consuming and costly operation. If the aforesaid methods are not employed by companies producing heat exchanger elements, it then becomes necessary to inventory a great variety of sizes, shapes and kinds of spacers and clamps for use with the infinite variety of such heat exchanger elements possible.

The spacer of the present invention permits a great deal of flexibility in the design of the heat exchanger since it is not limited for use with any particular size of element or number of convolutions of tubing. Its use eliminates the need of stocking numerous quantities of a variety of spacers of varying sizes and shapes, since only one size and only one shape may be used on a wide range of tubular heat transfer elements.

The present spacer may be installed quickly, efficiently and positively, and may be rigidly secured in position by banding, bolting, wiring or the like. The individual convolutions of tubing are securely and permanently fixed in spaced relation to each other—the spacing being a constant factor predetermined to achieve maximum efficiency with only a minimum of tubing. The spacer and clamp of my invention also eliminates all need for welding, brazing or soldering of any part around or to any one or all of the individual convolutions of the element. It is well known that welding, brazing or soldering is highly undesirable in such elements because of the disturbance introduced into the metallurgical structure of the tubing during the welding process coupled with the stress disturbances created by the addition of a foreign material having a dissimilar coefficient of expansion.

Furthermore, the spacer of my invention may be made of the same tubing as the heat exchanger element itself, thereby eliminating the electrolytic action common to two juxtaposed metals of unlike metallurgical composition—a reaction usually experienced when using conventional spacer clamps. Since the spacer of the present invention may be made of the same material as the element tubing, the coefficients of expansion thereof would be identical. When using conventional spacers of unlike material and coefficients of expansion, stresses are developed within the element which cause undue metal fatiguing, thereby materially reducing its effective life.

The opposed ends of my spacer have substantially flat surfaces which, when a plurality thereof are in assembled relation, lie in a common plane and provide a relatively flat surface for positioning upon or against a supporting structure.

Since my spacer is particularly adapted to be stamped from tubing or the like, it is very inexpensive to produce. Furthermore, it may even be stamped from scrap or reject material thus reducing its cost still further.

It is an object of the present invention to provide a versatile spacer for supporting, spacing and clamping the tubular convolutions of heat exchanger elements for boilers and the like and which may be used on any such element regardless of its shape or dimension.

It is another object of my invention to provide a simple, easily installed spacer which will rigidly secure the individual tubular convolutions of said element in a predetermined spaced relationship to each other.

Another object of my invention is to provide a spacer which eliminates the need for destructive brazing, welding or soldering in the use thereof.

A further object of the present invention is to provide a spacer which can be economically produced from standard tubing.

Another object is to provide a spacer which may be produced from scrap or reject tubing to further reduce the cost thereof.

Still another object is to produce a spacer which may be made from the same material as the tubing of the heat exchanger element itself thereby avoiding harmful stressing thereof caused by differences in the coefficients of expansion of the element and the spacer.

A still further object is to provide a spacer adapted to be made of a like material to that of the element in order to avoid the electrolytic reaction common to abutting metals of unlike composition.

Another object of my invention is to provide a means for spacing the tubular convolutions of said element to permit a free flow of fluid about the entire surfaces thereof.

Still another object is to furnish a spacer having substantially flat ends whereby a plurality thereof in assembled relation may provide a relatively flat surface for positioning said element upon or against a supporting structure.

Other objects and advantages of my improved spacer will become apparent from the following description and accompanying drawing in which:

FIG. 1 is an elevational end view, partly in section, illustrating a plurality of my improved spacers as used for spacing and clamping the tubular element of a heat exchanger.

FIG. 2 is a plan view of my improved spacer.

FIG. 3 is a side in view thereof in central vertical section.

FIG. 4 is an elevational end view of said spacer.

FIG. 5 is a sectional view of said spacer taken on line 5—5 of FIG. 2 and showing the spacer as used with a finned-type element tube.

FIG. 6 is an elevational side view of the heat exchanger of FIG. 1 showing my improved spacer in assembled relation.

As shown in the drawing, my improved spacer comprises an elongated member 5 preferably produced from a relatively straight piece of tubing and having a centrally located, substantially cylindrical portion 6 and opposed, transversely extending concave seats 7—7 formed in its opposite end portions about parallel axes extending substantially perpendicular to the axis of said member 5. The said seats 7—7 are spaced inwardly from the ends of the member 5 to provide opposed, terminal portions 8—8 thereon; said terminal portions have substantially flat, annular edges 9—9 which, when a plurality of my spacers are in assembled relation, lie in a common plane and provide a relatively flat surface for engagement with a supporting structure.

Thus, the tubular members 10—10 of a heat exchanger element incorporating my improved spacers are spaced from said supporting structure to allow the free flow of hot fluids, whether liquid or gaseous, over, under and through each of the individual convolutions of tubing including those immediately adjacent to and spaced from the surface upon or against which the element is supported. Furthermore, by so spacing the element any possible electrolytic action between the metal parts of the heat exchaner and the element tubing may be virtually eliminated since no part of the element can or will be in abutting contact with the heat exchanger itself.

In the form of the invention illustrated the spacer is provided with centrally located, coaxial holes 11—11 which extend through the walls of the central portion 6 in a direction transversely of the seats 7—7. When said spacers are assembled to a heat exchanger element as shown in FIGS. 1 and 6 with the convolutions of the tubing of the element resting in the seats 7—7 of the spacers, said holes 11—11 are aligned and are adapted to receive a clamping bolt 12 having a threaded end portion for the reception of a nut 13 which is used to clamp the spacers in assembled position.

My new and improved spacers may be used in a heat exchanger element formed of tubing within the usual range of standard outside diameters customarily used therefor. There is likewise no limit to the number of spacers which may be used in any one element other than the basic limitation inherent therein due to the number of convolutions of tubing comprising said element.

In order to maximize the efficiency of a heat exchanger element, it is righly desirable to expose as much tubing surface as possible to direct contact with the fluid medium circulating in and around the said element while keeping to a minimum the space requirement therefor within the heat exchanger. Only by spacing the individual convolutions of tubing to a predetermined minimum distance can this be achieved while yet insuring an unrestricted flow of fluids thereabout sufficient to effect an adequate transfer of heat therefrom to the liquid circulating within said element. The maximum efficiency of an element is thus attained when there is a maximum transfer of heat from said fluids to said liquids while utilizing a minimum footage of element tubing. My improved spacer permits the pre-engineered spacing requirements of the tubing convolutions to be economically utilized and maintained whereby maximum efficiency of the element may be readily realized.

Because of the unique shape of the seats 7—7 provided by my improved spacer wherein the transverse dimension of the base 14 thereof is greater than the diameter of the tubing from which my spacer is made, a bearing surface of sufficient area is provided to receive and securely hold a plurality of fins 15 which extend radially from the wall 16 of one form of heat exchanger tubing as shown in FIG. 5 of the accompanying drawing. Since the use of finned element tubing is particularly desirable in heat transfer applications because it provides a greater surface exposure to the hot fluids, the versatility of my spacer whereby such tubing may be used without special modification thereof makes it especially desirable for such use.

Another very practical aspect of my spacer is its ease and economy of manufacture. As is apparent, my spacer may be readily stamped from stock tubing or even from scrap or reject tubing which would otherwise be of little or no value. Conventional punching equipment and relatively inexpensive dies may be used to insure the production of spacers of my design wherein the pre-engineered spacing of the element tubing will be maintained by the spaced seats of my spacer thereby providing uniformity of spacing throughout each element and from one element to another.

I claim:

1. A spacer comprising an elongated tubular member having a central portion of substantially circular cross-sectional shape and portions of concavo-concave configuration at the opposite sides of said central portion defining longitudinally spaced pairs of opposed seats in said member, the axes of said seats being substantially parallel and extending substantially perpendicular to the longitudinal axis of said member, said seats being adapted to receive the adjacent coils of a tubular heat exchanger element, and annular end terminal portions extending outwardly of said seats provided with end edges lying in a plane substantially perpendicular to the longitudinal axis of said member and adapted for substantially flat engagement with a supporting surface.

2. A spacer as set forth in claim 1 wherein the central portion of said spacer has aligned openings extending through the walls thereof on an axis substantially perpendicular to the axes of said seats and adapted to receive a fastening member.

References Cited in the file of this patent

UNITED STATES PATENTS

| | | |
|---|---|---|
| 2,462,399 | Hinchman | Feb. 22, 1949 |
| 2,799,907 | Kohtz | July 23, 1957 |

FOREIGN PATENTS

| | | |
|---|---|---|
| 762,871 | France | Apr. 19, 1934 |